(12) United States Patent
Khamis et al.

(10) Patent No.: US 11,498,025 B1
(45) Date of Patent: Nov. 15, 2022

(54) EXHAUST SCRUBBER SYSTEM AND METHOD

(71) Applicant: Thursday Pools, Fortville, IN (US)

(72) Inventors: William Khamis, Fortville, IN (US); Edward Vondell, Fishers, IN (US)

(73) Assignee: Thursday Pools, Fortville, IN (US)

( * ) Notice: Subject to any disclaimer, the term of this patent is extended or adjusted under 35 U.S.C. 154(b) by 477 days.

(21) Appl. No.: 16/703,164

(22) Filed: Dec. 4, 2019

(51) Int. Cl.
*B01D 53/02* (2006.01)
*B01D 53/04* (2006.01)

(52) U.S. Cl.
CPC ..... *B01D 53/0454* (2013.01); *B01D 53/0415* (2013.01); *B01D 2253/102* (2013.01); *B01D 2259/40084* (2013.01)

(58) Field of Classification Search
CPC ............ B01D 53/0454; B01D 53/0415; B01D 2253/102; B01D 2259/40084
See application file for complete search history.

(56) References Cited

U.S. PATENT DOCUMENTS

| | | | | |
|---|---|---|---|---|
| 3,935,803 A * | 2/1976 | Bush | ...................... | A61G 10/02 454/189 |
| 4,290,783 A * | 9/1981 | Adams | ................... | B01D 50/60 95/214 |
| 4,377,397 A * | 3/1983 | Clements | ............... | B01D 46/02 95/286 |
| 4,427,427 A * | 1/1984 | DeVecchi | .............. | B01D 46/12 55/385.2 |
| 4,667,580 A * | 5/1987 | Wetzel | ................ | E04B 1/34869 52/36.2 |
| 4,881,956 A * | 11/1989 | Jones | ..................... | B01D 47/08 95/219 |
| 5,069,691 A * | 12/1991 | Travis | ....................... | A47L 5/38 55/482 |
| 5,154,742 A * | 10/1992 | Gault | ..................... | B01D 45/08 55/320 |
| 5,433,763 A * | 7/1995 | Shagott | ..................... | A47L 5/38 55/374 |
| 5,511,409 A * | 4/1996 | Knaebel | ................ | G01N 1/405 73/31.03 |

(Continued)

*Primary Examiner* — Christopher P Jones
(74) *Attorney, Agent, or Firm* — C. John Brannon; Brannon Sowers & Cracraft PC

(57) ABSTRACT

A method of cleaning exhaust gasses, including first placing a plurality of filtration modules into a housing to define a filtration bed, then weighing the filtration bed to determine an unladen weight, filling the filtration bed with filter media to define a laden filtration bed, and weighing the laden filtration bed prior to exposure to exhaust gas. Next, calculating the weight of the filtration media prior to exposure to exhaust gas to determine an initial weight of the filtration media, directing exhaust gas through an inlet into a housing, directing exhaust gas from the inlet through the filtration bed, removing particulates and chemicals from the exhaust gas to define a cleaned gas, and directing the cleaned gas through an outlet. While cleaning the gas, periodically measuring the weight of the filtration bed and calculating the weight gain of the filtration media. When the weight gain of the filtration media exceeds a predetermined value, defining the filtration media as spent media and emptying each respective module of spent media into a container to yield a plurality of respective empty modules and a filled container.

8 Claims, 7 Drawing Sheets

(56) References Cited

U.S. PATENT DOCUMENTS

| | | | | |
|---|---|---|---|---|
| 6,026,539 A * | 2/2000 | Mouw | ............... | A47L 9/2805 |
| | | | | 116/264 |
| 6,139,607 A * | 10/2000 | Coulonvaux | ...... | B01D 46/0004 |
| | | | | 55/504 |
| 6,270,609 B1 * | 8/2001 | Markell | ............... | G11B 33/146 |
| | | | | 428/36.1 |
| 9,159,592 B2 * | 10/2015 | Flitsch | ............... | H01L 21/67733 |
| 10,371,394 B2 * | 8/2019 | Wernimont | ............. | F24F 3/167 |
| 2003/0024218 A1 * | 2/2003 | Stephens | ............ | B01D 46/0013 |
| | | | | 55/413 |
| 2005/0028672 A1 * | 2/2005 | Hickerson | .......... | B01D 53/0415 |
| | | | | 96/135 |
| 2006/0277875 A1 * | 12/2006 | Schuld | ................ | B01D 46/521 |
| | | | | 55/484 |
| 2007/0256395 A1 * | 11/2007 | Kosmider | .......... | B01D 46/0013 |
| | | | | 55/498 |
| 2008/0078289 A1 * | 4/2008 | Sergi | ................. | B01D 53/0446 |
| | | | | 55/467 |
| 2011/0283886 A1 * | 11/2011 | Ladha | ................... | B01D 46/50 |
| | | | | 95/278 |
| 2014/0208942 A1 * | 7/2014 | Scipio | ............... | B01D 46/0086 |
| | | | | 96/417 |
| 2016/0045848 A1 * | 2/2016 | Campbell | .......... | B01D 46/0005 |
| | | | | 55/497 |
| 2016/0067644 A1 * | 3/2016 | Scaife | ............... | B01D 46/0002 |
| | | | | 55/400 |
| 2018/0257017 A1 * | 9/2018 | Adamek | ........... | B01D 46/0005 |
| 2018/0352822 A1 * | 12/2018 | Fassel | ................... | A01N 43/36 |
| 2020/0033236 A1 * | 1/2020 | Shaikh | ............... | B01D 53/0407 |

* cited by examiner

EXHAUST SCRUBBER SYSTEM AND METHOD

TECHNICAL FIELD

The present novel technology relates generally to the field of industrial manufacture, and, more particularly, to a modular system allowing for the quick replacement of spent filtration media with new filtration media.

BACKGROUND

Many industrial manufacturing processes involve the use of chemicals that evolve gas borne particulates or vapors that are hazardous or simply noisome. Typically, industrial exhaust gasses are directed through scrubbers or filters, where the offending particulates and/or chemicals are removed for proper disposal.

On commonly used filtration medium is activated carbon. Activated carbon has a very high surface area to volume ratio, and carbon has excellent surface adsorption properties, allowing carbon to adsorb great quantities of particles from an exhaust gas stream. Activated carbon is especially efficacious for the removal of volatile organic compounds, siloxanes, hydrogen sulfide, chlorine and the like from gas streams. A quantity of activated carbon can typically adsorb several multiples of its own weight in noisome particles before it must be replaced.

However, typical industrial filters require the delivery and loading of great quantities of activated carbon (or like filtration media) into a filter stack (typically, a large silo), followed by a similar unloading of the spent filtration media (such as by vacuum pumping the media into a truck) to be carted away for proper thermal disposal and reactivation of the carbon. This process is typically a service of the carbon provider, and has a nontrivial expense associate d therewith, often on the order of several thousands of dollars for the transport service alone. Further, such servicing of the filtration silo must be scheduled, and is thus done at the convenience of the supplier and not necessarily when the filtration media has become too saturated to be effective. Thus, there remains a need for a method and apparatus that would allow for the manufacturer to load and unload the filter with filtration media when necessary and that allows the manufacturer to deliver the spent filtration media to the supplier for exchange and reactivation. The present novel technology addresses this need.

DETAILED DESCRIPTION OF THE PREFERRED EMBODIMENT

Figure 1:
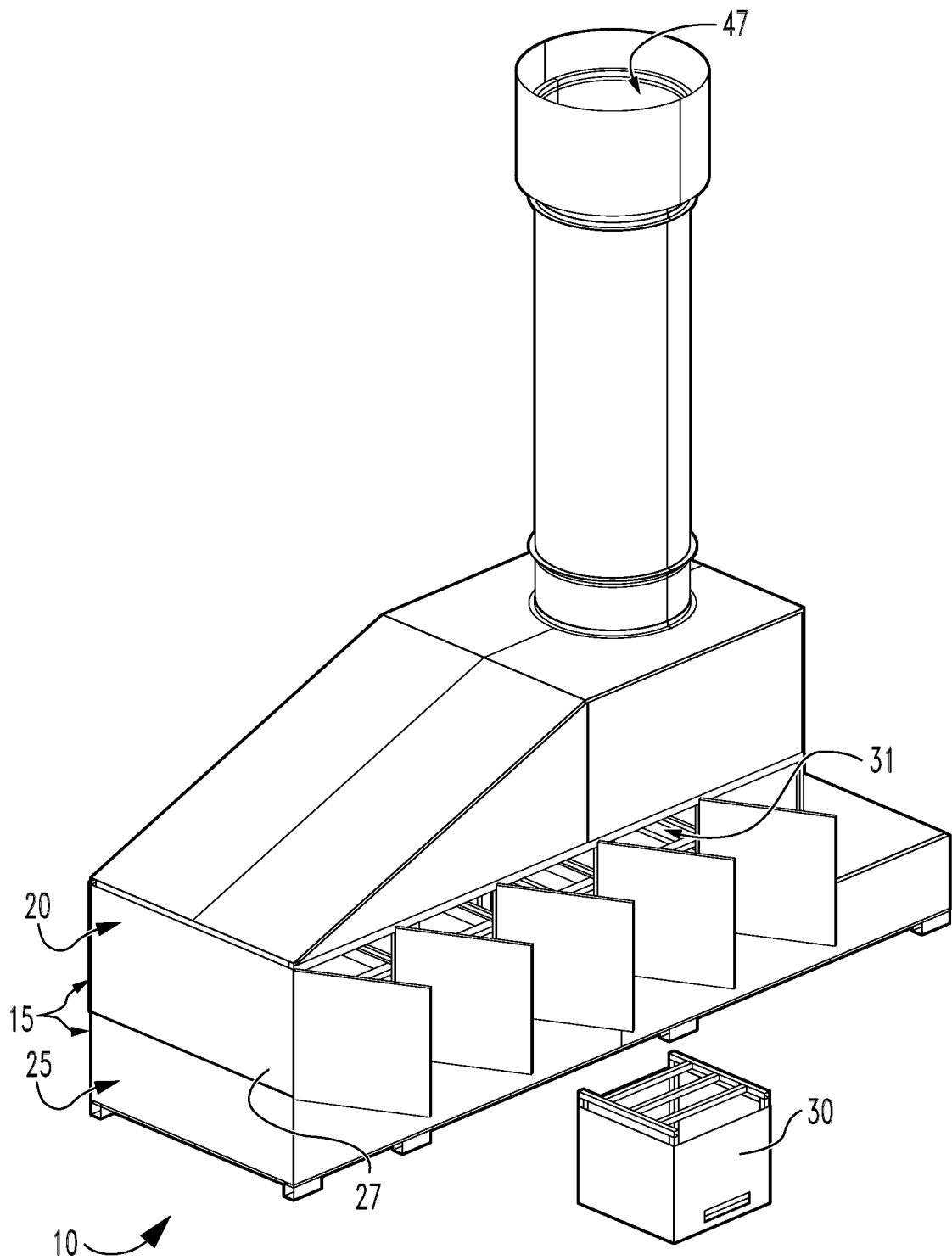
FIG. 1 is a top perspective view of a first embodiment modular air filtration assembly of the present novel technology.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

Figure 2:
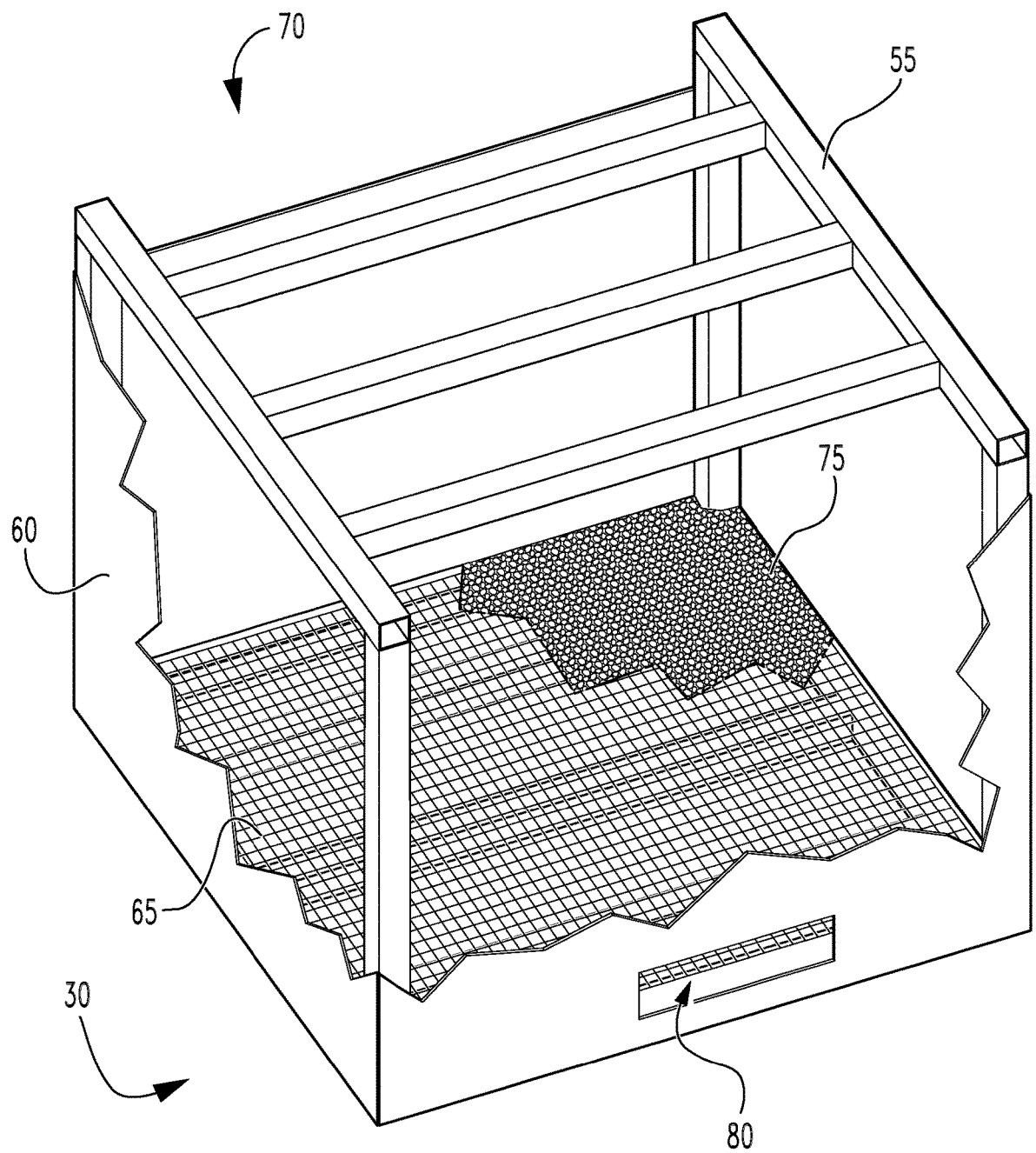
FIG. 2 is a top perspective partial cutaway view of an individual filter module of the assembly of FIG. 1.
Figure 3:
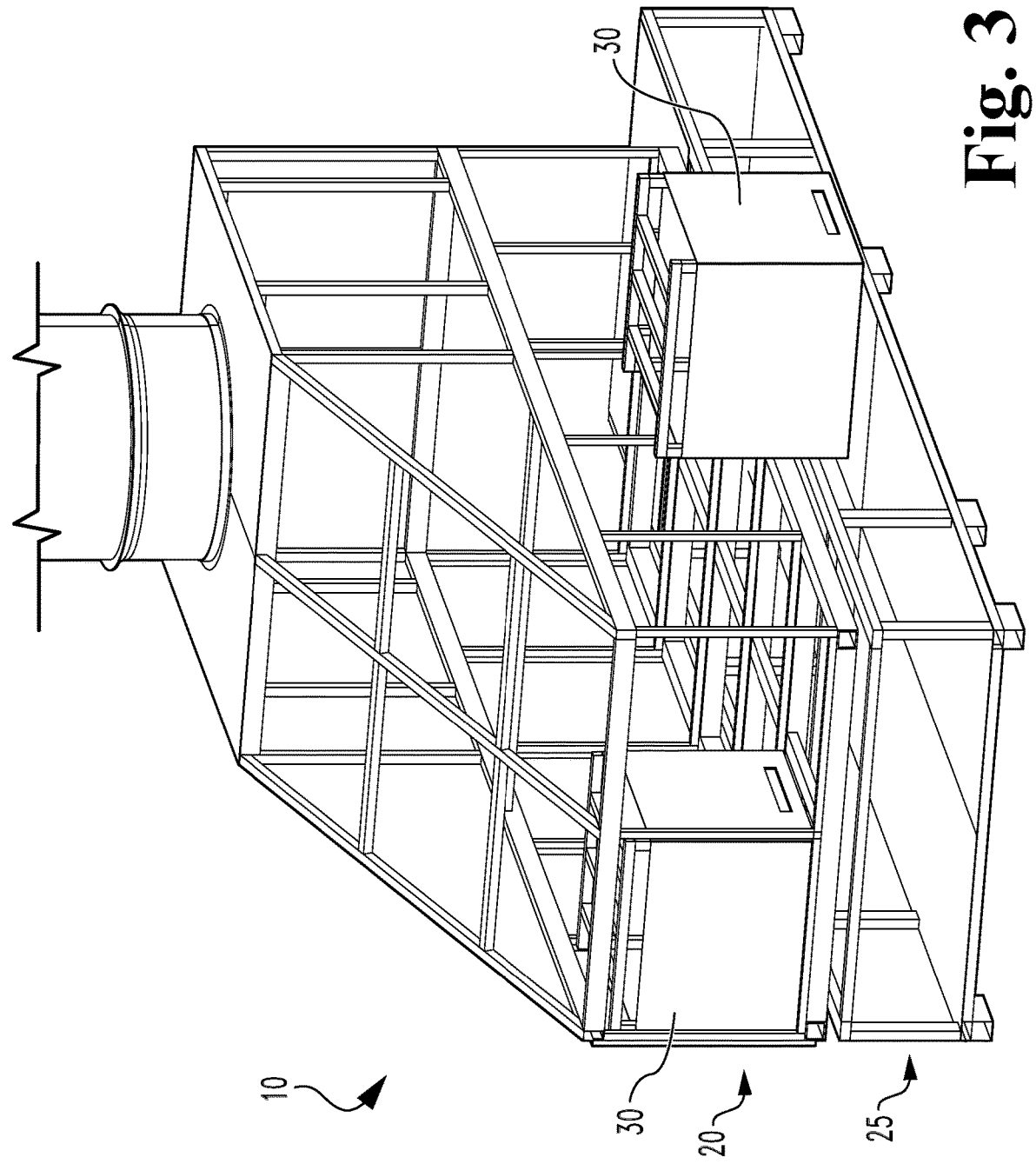
FIG. 3 is an end perspective cutaway view of the assembly of FIG. 1.
Figure 4:
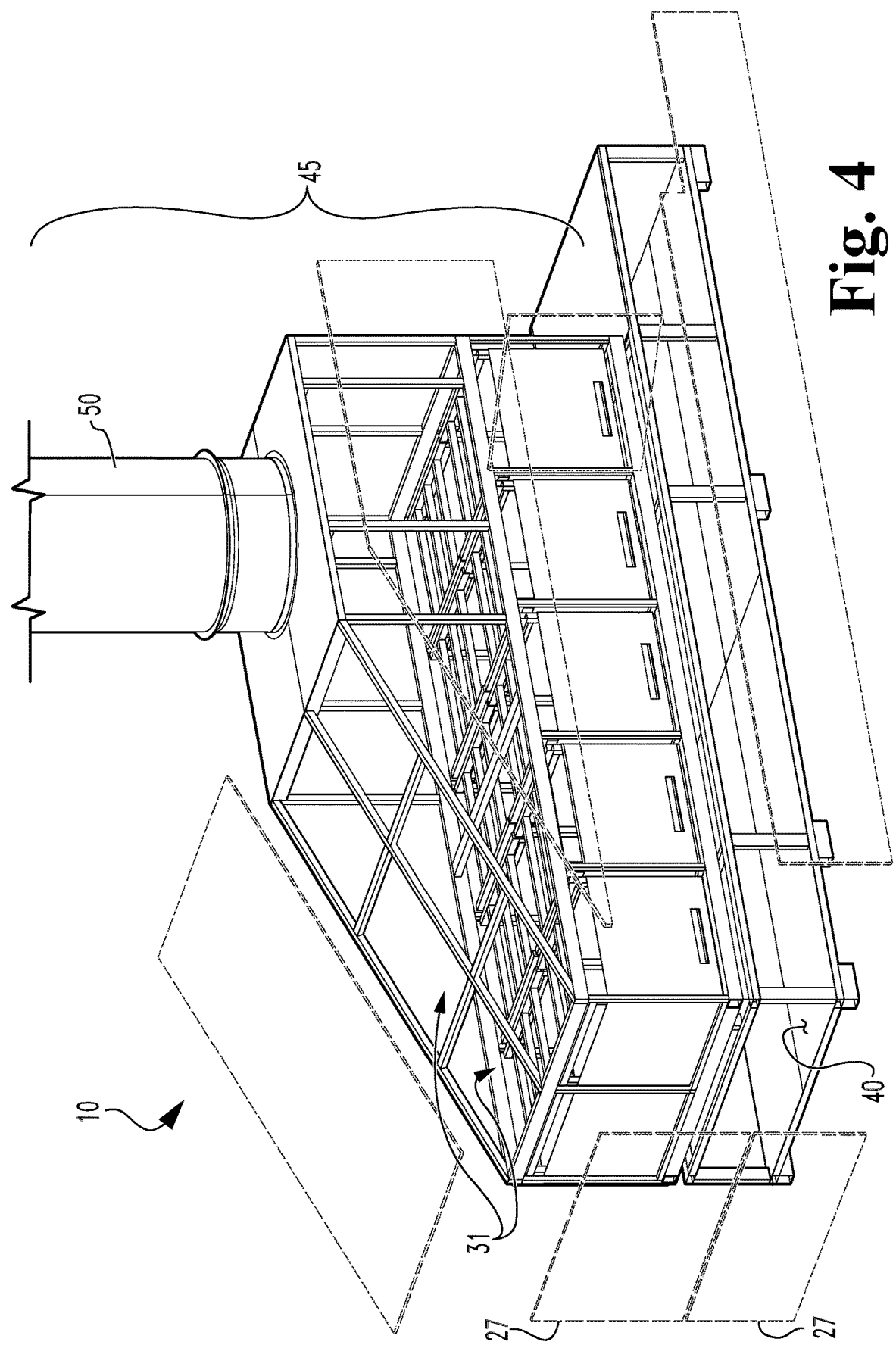
FIG. 4 is a side perspective partial cutaway view of the assembly of FIG. 1.
Figure 5:
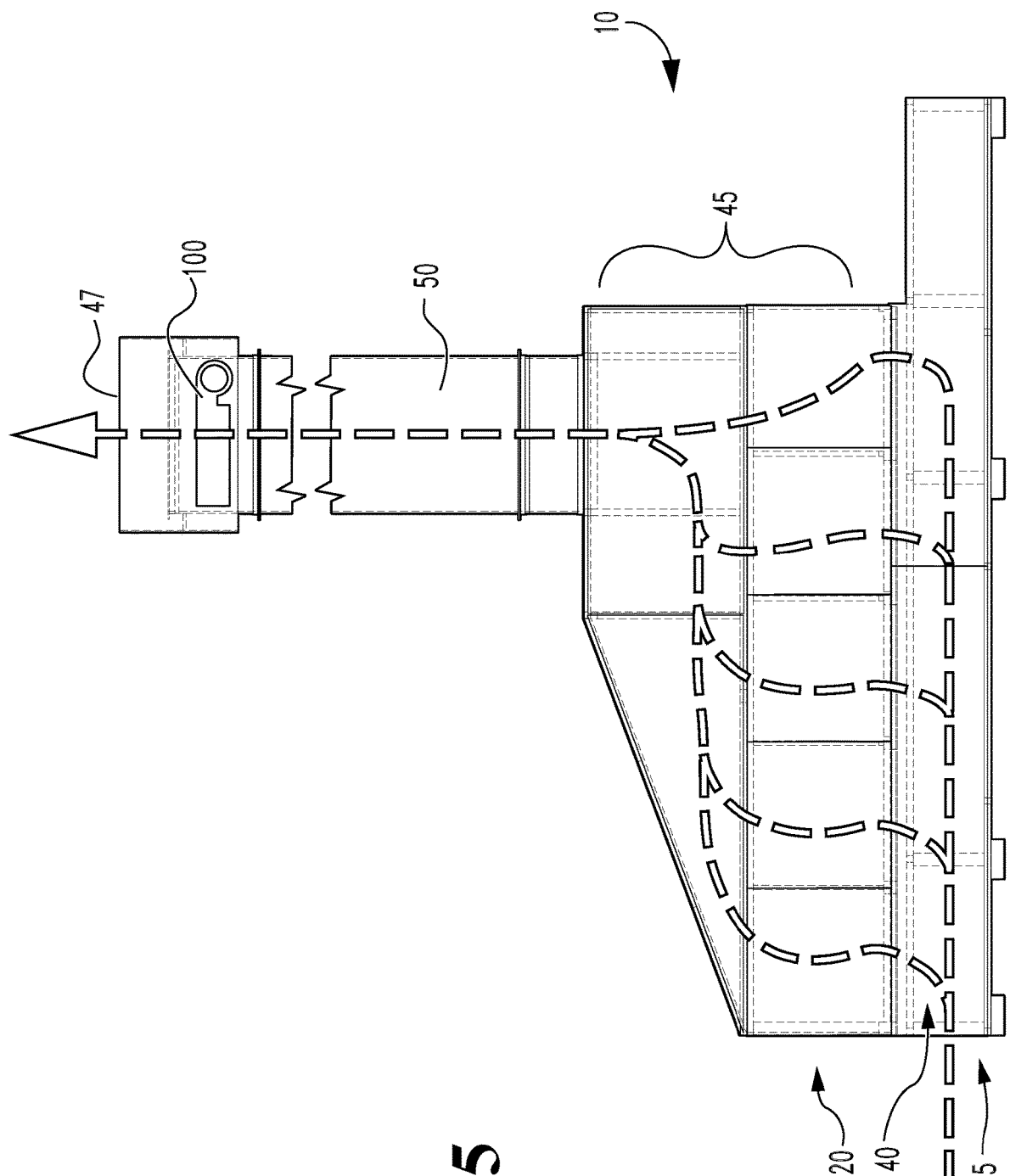
FIG. 5 is a side schematic view of the assembly of FIG. 1.
Figure 6:
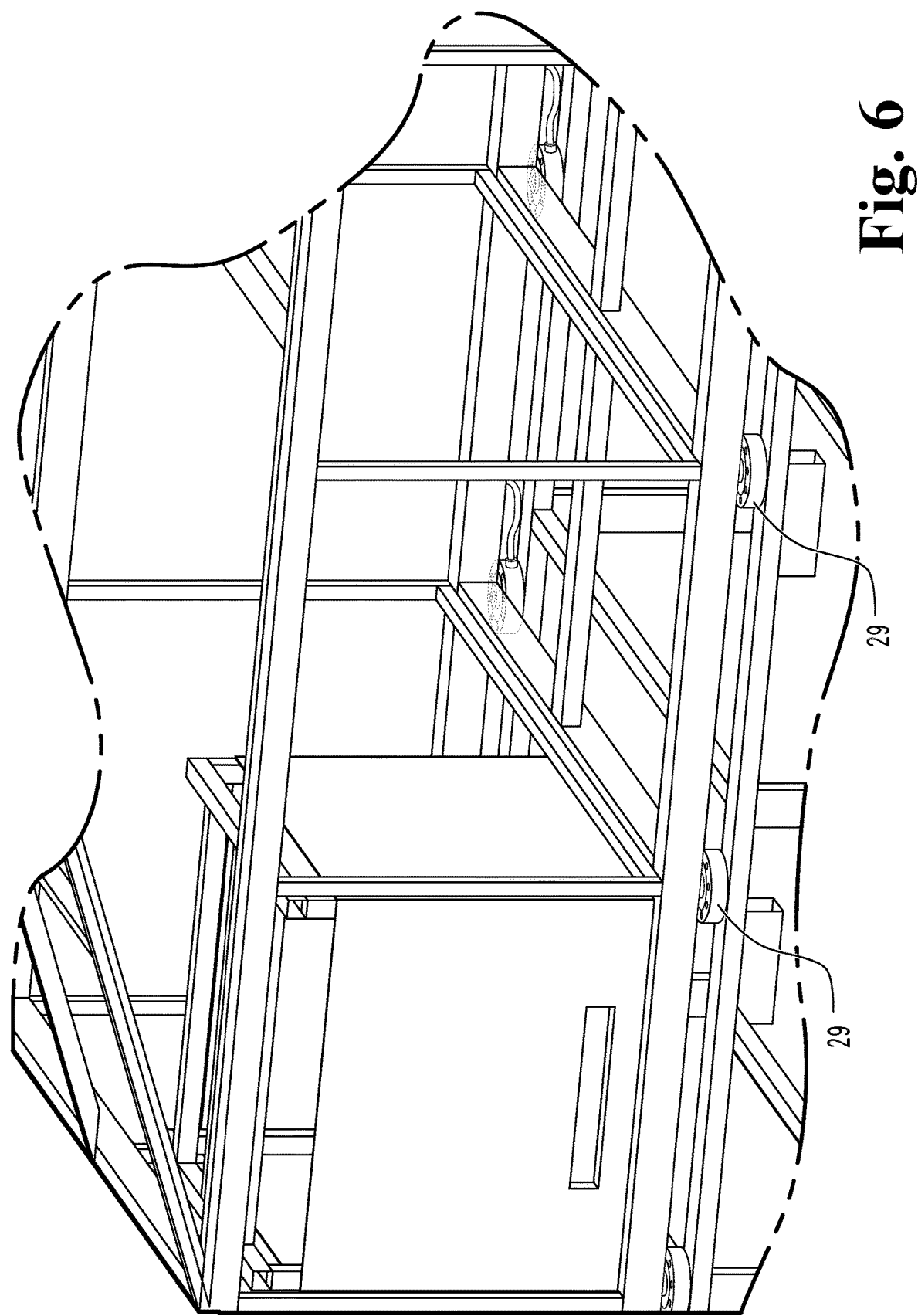
FIG. 6 is an enlarged side cutaway view of the assembly of FIG. 1 with a filter module positioned within.
Figure 7:
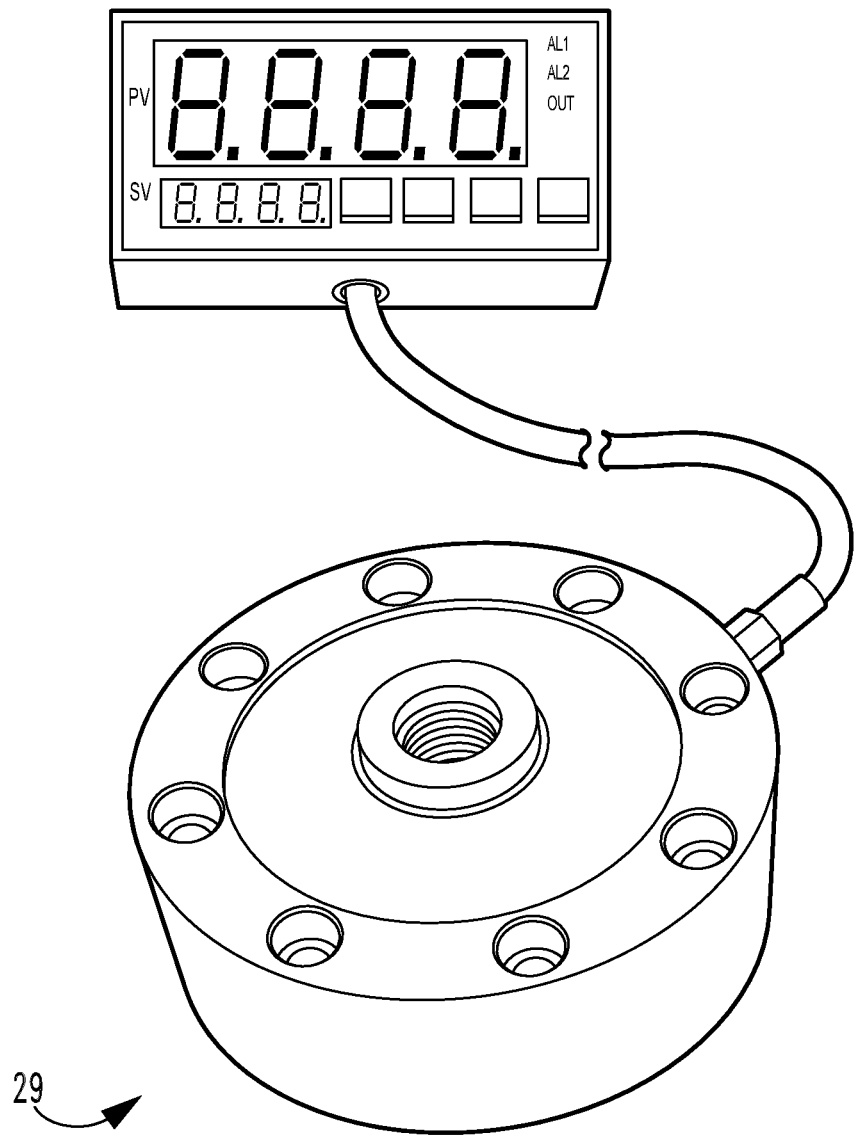
FIG. 7 is an enlarged perspective view of a weight sensor as positioned in the assembly of FIG. 1.

The present novel technology illustrated in FIGS. 1-7 relates to a system 10 for directing exhaust gasses through filtration media for the removal of unwanted particulates therefrom. The system includes a housing 15 that further includes separate upper and lower portions 20, 25. Upper portion 20 typically includes a skirt 27 operationally connected to and extending therefrom, such that when upper portion 20 rests upon and engages lower base portion 25, skirt 27 extends partially over lower portion, defining a seal. Typically, one or more sensors 29 are positioned at the interface between upper and lower portions 20, 25, such that the sensor 29 may measure the weight and/or other characteristics of the upper portion 20. Alternately, one or more sensors 29 may be positioned in the gas stream leaving the system 10 to determine the chemical composition and/or changes in the chemical composition of the gas stream exiting the system 10.

A plurality of filter receptacles 30 are arrayed within the housing 15 to define a filter bed 31 when the receptacles 30 are loaded with filter modules 35 containing filtration media 37. The filter receptacles 30 are typically defined by a plurality of structural members connected to the top portion 20. The upper portion 20 typically includes a plurality of access panels or doors 39, each door 39 positioned to allow access to a filter receptacle 30 (or to two or more receptacles, such as if the housing 15 is wide enough to insert two or more modules 35 in a row, i.e. to be positioned adjacent one another).

The housing 15 includes an inlet 40 formed through the bottom portion 25 for directing exhaust gas into the housing where it is contained and directed through the filtration media 37 in the filter bed 31. The upper portion 20 defines a collection volume 45 above the filter bed 31, which includes an outlet port 47 formed through the upper portion 20, typically at its highest point. An exhaust chimney 50 is typically connected to the outlet port 47 to direct scrubbed gasses away.

Each module 35 is typically an orthorhombic tetrahedral container defined by a metal or otherwise structural frame 55 and includes a mesh floor or bottom member 65, and oppositely disposed generally open, and typically barred, top 70, and four structural walls 60 extending therebetween. The elongated members (such as square tubing) defining the frame 55 and bared top 70 are typically formed from a structural material, such as steel or aluminum, as are the wall members 60. The bottom portion 65 is made of a structural, typically metallic, mesh material having a mesh size too small for any filter media 75, typically activated carbon particles, filling the module 35 to pass through while readily passing exhaust gasses therethrough.

Each respective module 35 further includes a drain port 80 formed therethrough, typically through a wall 60 and positioned near or adjacent the bottom 65. Alternately the port 80 may be formed though the bottom 65. In some embodiments, one or more walls may be slidingly connected to the frame 55 such that the wall 60 may be slid away from the bottom 65 to functionally define a port 80 through which the spent carbon 75 may be poured out or otherwise evacuated.

One or more strain gauges or weight sensors 29 are typically positioned at the interface between the top portion and the bottom portion. Such sensors 29 may be used to measure the unladen weight of the top portion 20, the weight of the top portion 20 when filled with virgin filtration media 75, and the weight of the top portion 20 when the filtration media 75 has adsorbed noisome or otherwise undesired particles from the exhaust gas flow. The filtration media 75 may be changed when the weight thereof increases to a predetermined value. Further, the weight increase of the filtration media 75 may be charted as a function of time and/or of the volume of exhaust gas flow therethrough, and the filtration media 75 may be changed when the plotted curve indicates the filtration media 75 is no longer adsorbing particulates efficiently. An electronic controller or microprocessor 95 may be operationally connected to the weight sensor 29 and/or other sensors to monitor the filtration process and transmit an alert when filtration is no longer occurring efficiently or within some set of predetermined parameters. Alternately, the microprocessor 95 may be operationally connected to a chemical sensor 29 in the exhaust gas stream downwind from the filter media 75, and a signal may be sent to change the media 75 when the exhaust gas composition indicates that the filters 75 are no longer efficiently removing undesired particles and gasses therefrom.

Example 1

A filtration system 10 using activated carbon filtration media 75 is operationally connected to a fiberglass swimming pool manufacturing bay. Exhaust gasses from the fiberglass manufacturing process are drawn through the inlet 40, such as by a pump 100 operationally connected to the outlet 47, and directed through the activated carbon 75 filling one or more filter modules 35 filling the filter receptacles 30 defining a filter bed 31 wherein particulates are adsorbed to the activated carbon media 75 to yield filtered exhaust gas. The filtered exhaust gas is directed out through the outlet 47 and out the chimney 50.

When a predetermined mass of particulates is adsorbed to the activated carbon media 75, as measured by pressure sensor 29, a signal is sent calling for the removal of the saturated filtration media 75 and its replacement with virgin activated carbon 75. The respective modules 35 are removed from the housing 15 through respective doors 39 via forklift, positioned over a container, the exit ports 80 are opened, and the spent media is poured into the container. The container is then removed for transport to the carbon supplier, and the modules 35 are each reloaded with virgin activated carbon 75 and replaced into the housing 15 via forklift through the respective doors 39. The doors are closed, and filtration of the exhaust gas stream is resumed.

Example 2

A filtration system 10 is provided by engaging a bottom base portion 25 with top shell portion 20 having a skirt 27 that extends partially over and around the bottom base portion 25 to define a seal. At least one weight sensor 29 is disposed between the top and bottom portions 20, 25 to measure the weight of the top portion. A plurality of filter modules 35 are first filled activated carbon media 75 and then disposed within the filtration system, each module 35 suspended from a receptacle 30 in the upper portion 20 to define a filtration bed 31. Exhaust gasses are drawn through an inlet 40, flowed through the filtration bed 31 for removal of unwanted particulates and chemicals by the media 75, and then directed through an outlet 47.

When a predetermined mass of particulates is adsorbed to the activated carbon media 75, as measured by pressure sensor 29, a signal is sent calling for the removal of the saturated filtration media 75 and its replacement with virgin activated carbon 75. The respective modules 35 are removed from the housing 15 through respective doors 39, such as via forklift, emptied into a container by opening respective exit ports 80 in each respective module 35, and then refilled. The container is then stored and/or transport to a carbon supplier for recharging. The modules 35, reloaded with virgin activated carbon 75, are replaced into the housing 15 (typically via forklift) through the respective doors 39. The doors 39 are closed and filtration of the exhaust gas stream is resumed.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. An air cleaning system comprising:
    a housing having a lower base portion and an upper shell portion shaped to rest upon and engage the lower base portion;
    a skirt operationally connected to and extending from the upper shell portion, wherein when the upper shell portion engages the lower base portion the skirt extends partially over the lower base portion to define a seal;
    at least one pressure sensor operationally connected between the upper shell portion and the lower base portion to measure the weight of the upper shell portion;
    a plurality of receptacles operationally connected to the upper shell portion and disposed within the housing;
    at least one access panel operationally connected to the upper shell portion, wherein the at least one access panel may be opened to yield access to the plurality of receptacles;
    a plurality of filter modules, each respective filter module receivable in a respective receptacle;
    wherein each module defines a mesh floor, an oppositely disposed substantially open top, and at least one sidewall extending therebetween to define an open-top enclosure for containing filtration media.

2. The system of claim 1 wherein the at least one access panel is a plurality of respective access panels.

3. The system of claim 1 wherein the respective modules contain filter media.

4. The system of claim 3 wherein the filter media is activated carbon.

5. The system of claim 1 wherein each respective module further comprises a respective outlet port operationally connected thereto.

6. The system of claim 1 wherein each respective receptacle filled with a respective module defines a filter bed; and further comprising an air inlet formed through the bottom base portion and in fluidic communication with the filter bed; and an air outlet port formed through the upper shell portion and in fluidic communication with the filter bed.

7. The system of claim 6 wherein the air inlet, the filter bed, and the air outlet define an air flow path; and further comprising an air pump operationally connected to the air flow path to pump air through the inlet, through the filter bed, and out the outlet port.

8. The system of claim 7 and further comprising a microprocessor operationally connected to the at least one pressure sensor and to the air pump.

* * * * *